United States Patent
Kishimoto et al.

(10) Patent No.: US 6,628,580 B1
(45) Date of Patent: Sep. 30, 2003

(54) OPTICAL RECORDING AND REPRODUCING APPARATUS

(75) Inventors: Takashi Kishimoto, Nara-ken (JP); Takeharu Yamamoto, Osaka-fu (JP); Katsuya Watanabe, Nara-ken (JP); Tatsuya Takeuchi, Kyoto-fu (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/545,877

(22) Filed: Apr. 7, 2000

(30) Foreign Application Priority Data

Apr. 7, 1999 (JP) .......................................... 11-099663

(51) Int. Cl.$^7$ ................................................ G11B 7/00
(52) U.S. Cl. .................................................. 369/44.28
(58) Field of Search ........................ 369/44.28, 44.29, 369/30.16, 30.17, 94, 44.25, 44.27

(56) References Cited

U.S. PATENT DOCUMENTS

| | | | | |
|---|---|---|---|---|
| 4,899,325 A | * | 2/1990 | Katsuhara et al. | 369/30.16 |
| 5,046,058 A | * | 9/1991 | Shimonou | 369/44.28 |
| 5,101,386 A | * | 3/1992 | Kojima et al. | 369/44.28 |
| 5,623,464 A | * | 4/1997 | Tani | 369/44.28 |
| 5,903,530 A | * | 5/1999 | Tateishi et al. | 369/44.27 |
| 5,933,397 A | * | 8/1999 | Yamashita et al. | 369/44.28 |
| 6,011,762 A | | 1/2000 | Watanabe et al. | |

FOREIGN PATENT DOCUMENTS

JP          9-326123 A          12/1997

* cited by examiner

Primary Examiner—Thang V. Tran
(74) Attorney, Agent, or Firm—Wenderoth, Lind & Ponack, L.L.P.

(57) ABSTRACT

In track jumping or focus jumping in an optical recording and reproducing apparatus for an optical disk, a light beam is accelerated and decelerated from a track to an adjacent one or from an information plane to an adjacent one in the optical disk. A moving time of light beam under acceleration to an adjacent track or information plane for jumping is measured from the start of acceleration to a predetermined point according to tracking o focus error signal. Then, the deceleration signal for tracking or focus actuator is changed on amplitude or period according to the measured period. Thus, track or focus jumping can be performed stably against external disturbances. Alternatively, the light beam is forced to be driven until the level of the tracking or focus error signal is decreased below a predetermined value after the output of the deceleration signal is completed.

14 Claims, 14 Drawing Sheets

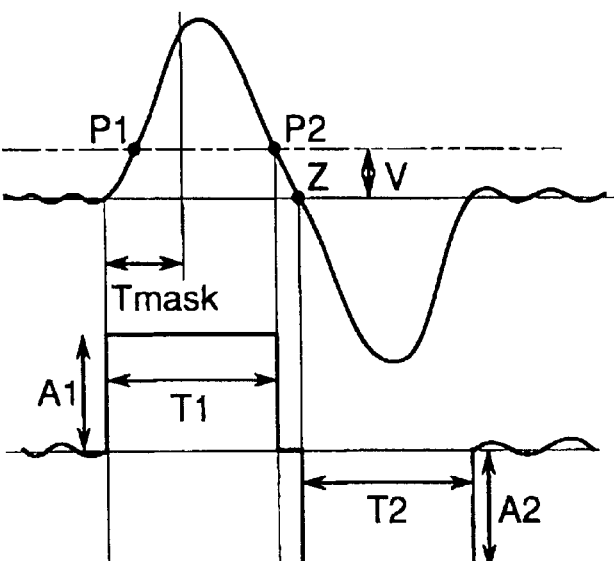
Fig.4A
Fig.4B
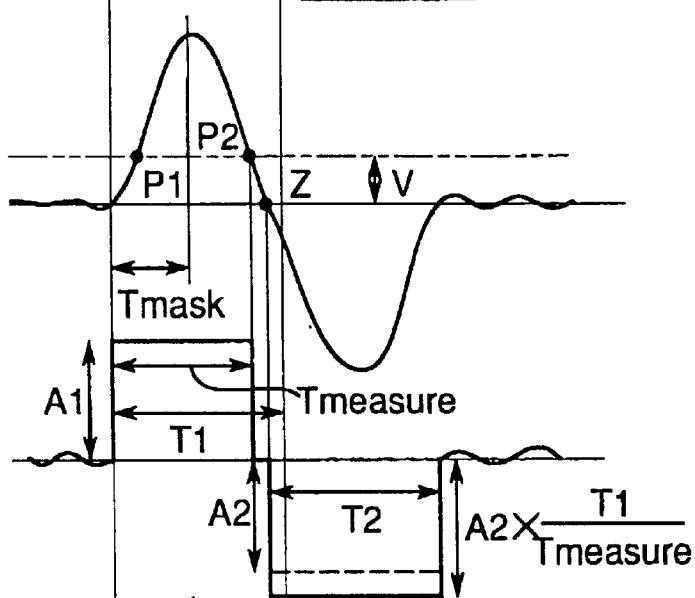
Fig.4C
Fig.4D
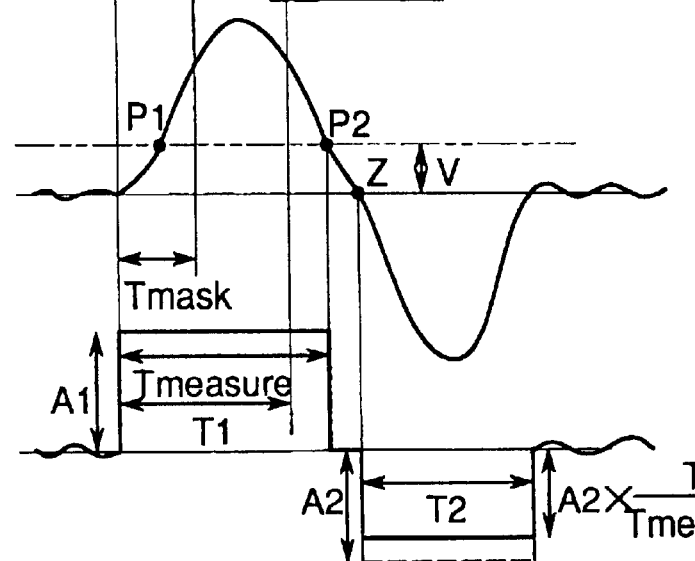
Fig.4E
Fig.4F ial recording and
reproducing apparatus which optically records information
to a recording medium and/or optically reproduces information from a recording medium by using a light beam from a
light source such as a laser. In particular, the present
invention relates to an optical recording and reproducing
apparatus that controls on track jumping, where a light spot
is moved from a track to an adjacent track, and focus
jumping, where a light spot is moved from an information
plane to an adjacent information plane of a medium having
a plurality of information planes.

2. Description of Prior Art

In an optical recording and reproducing apparatus, an
optical head has a light source such as a laser and an optical
sensor. A light beam from the light source is focused on a
recording medium such as an optical disk to optically record
information in the medium, and a light reflected from the
medium is detected with the sensor to reproduce information
from the medium. Focus control and tracking control for
recording and reproduction are also performed with the
optical sensor. An example of such an optical disk apparatus
is described in U.S. Pat. No. 6,011,762.

In a search for a specified information track, the tracking
is stopped, and the optical head including a tracking actuator
is moved in the radial direction of a recording medium while
counting the number of tracks on a medium over which the
light beam crosses. When the number of tracks to the
specified track is a few, in order to surely and stably arrive
at the specified track, a pulse for acceleration or deceleration
is applied to the tracking actuator while enabling the
tracking, and the track jumping to move the light beam to an
adjacent track is repeated.

An example off prior art track jumping is explained here.
In track jumping to an adjacent track, a drive signal applied
to the tracking actuator is changed to control the position of
the optical head, as explained below. A tracking error signal
obtained with an optical sensor is subjected to gain change
and passes a low pass filter. The signal is added next with a
pulse signal for acceleration/deceleration, and the sum signal is applied to the tracking actuator for driving it. Track
jumping is affected by harmonic components due to partial
eccentricity and eccentricity generated by undulation of
tracks of an optical disk. The cut-off frequency of the low
pass filter is set low to pass the eccentricity components of
the optical disk sufficiently. Thus, the low frequency components of the tracking error signal (eccentricity
components) are added to the pulse signal for acceleration/
deceleration, and the sum signal is used to drive the tracking
actuator. Then the unstableness of track jumping due to
eccentricity of the optical disk is decreased.

FIGS. 1A–1F show waveforms on track jumping in a
direction to the inner of the disk. FIG. 1A shows tracking
error (TE) signal while FIG. 1B shows tracking drive
waveform, in normal situations. On track jumping in a
direction to the outer periphery of the disk, only the polarity
of the tracking error signal and the tracking drive waveform
is changed. Then, the waveform diagrams and the explanation therefor are omitted here. By starting to output a pulse
for acceleration (of wave amplitude A1), the optical head
starts to be moved along the direction, and the sinusoidal
tracking error signal appears. The acceleration pulse is
outputted in a predetermined time T1. Next, when the zero
cross point (Z) of the tracking error signal is detected, a
pulse for deceleration (of wave amplitude A2) is outputted
for a time T2. Then, track jumping to an adjacent track is
completed, and the tracking control is started again. Track
jumping in the opposite direction to an outer peripheral, the
tracking error signal and the tracking drive waveform are
changed only on the polarity.

Focus jumping is controlled for an optical disk having a
plurality of information planes from one information plane
to another one. Similarly to the track jumping control, pulses
for acceleration/deceleration of predetermined amplitude
and period are applied to focus actuator successively by
considering vibration components of an optical disk. For an
optical disk having two information planes, L0 nearer to the
optical head and L1 farther therefrom, when a focus lens is
raised gradually from a sufficiently low position, as shown
in FIG. 2, a focus error signal is obtained as a sinusoidal
(S-like) wave in correspondence to the two information
planes. When information in the plane L0, focus control is
performed at around point X1, while when information in
the plane L1, focus control is performed at around point X2.
For the focus jumping from information plane L0 to L1, the
focus control position is changed from point X1 to point X2.
When the jumping is started, the sinusoidal waveform
appears as focus error (FE) signal, similarly to track jumping. Then, focus jumping control is performed similarly to
the track jumping control.

As explained above, in a prior art optical recording and
reproducing apparatus, when the track is jumped to an
adjacent track, pulses for acceleration/deceleration of predetermined amplitude and period are applied to a tracking
actuator by considering eccentricity components of an optical disk. However, especially when the disk information is
recorded or reproduced at high speed, external disturbance
frequencies become high due to eccentricity components.
Then, the gain of servo is decreased, and the performance to
find the track becomes low, so that the degree of off-tracking
becomes larger for the external disturbances. FIG. 1C shows
tracking error signal and FIG. 1D shows tracking drive
waveform when the moving speed is high, while FIG. 1E
shows tracking error signal and FIG. 1F shows tracking
drive waveform when the moving speed is low. In these
situations, the moving speed of the light beam is scattered
after the acceleration pulse is outputted, and the position of
the light beam is fluctuated even when the same deceleration
pulse is applied to the tracking actuator. Thus track jumping
becomes unstable. A similar problem also occurs when
external vibrations or an impact is applied to the apparatus.

Similarly, when focus jumping from one information
plane to another is performed in a prior art apparatus for an
optical disk having a plurality of information planes, pulses
for acceleration/deceleration of a predetermined magnitude
and a predetermined period are applied to a focus actuator
successively by considering harmonic components of partial
plane deflection or plane deflection due to undulation of
information planes in an optical disk. However, similarly to
the track jumping explained above, especially when the
information is recorded or reproduced at high speed, external disturbance frequencies become high due to the harmonic components. Then, the gain of servo is decreased, and
the ability to find an information plane becomes low, so that
the degree of defocusing becomes larger for the external
disturbances. In these situations, the moving speed of the
light beam is scattered after the acceleration pulse is
outputted, and the position of the light beam is fluctuated when the same deceleration pulse is applied to the focus actuator. Thus focus jumping becomes unstable. A similar problem also arises when external vibrations or an impact is applied to the apparatus.

SUMMARY OF THE INVENTION

An object of the present invention is to provide an optical recording and reproducing apparatus which performs stable track jumping and/or focus jumping.

In one aspect of the present invention, an optical recording and reproducing apparatus comprises a focus device which illuminates and focuses a light beam onto a recording medium on which tracks are formed, and a moving device which moves the focus device in a direction to cross tracks on the recording medium. A tracking error detector generates a tracking error signal in correspondence to a position relationship between the light beam and a track on the recording medium, and a tracking controller drives the moving device to make the light beam scan the track according to the tracking error signal outputted by the tracking error detector. A track jumping device comprises an acceleration device and a deceleration device for moving the light beam from a first track to an adjacent second track on the recording medium. The acceleration device applies an acceleration signal to accelerate the light beam to the moving device until the light beam reaches a predetermined point between the first and second tracks, while the deceleration device applies a deceleration signal to the moving device to decelerate the light beam accelerated by the acceleration device. Further, a timer measures a period from a first time when the light beam is started to move by the track jumping device to a second time when the light beams arrives the point between the first and second tracks, and the deceleration device in the track jumping device changes waveform (amplitude or period) of the deceleration signal on the basis of the period measured by the timer. Focus jumping is controlled similarly for an optical disk having a plurality of layered information planes.

In another aspect of the invention, an optical recording and reproducing apparatus comprises the focus device, the moving device, the tracking error detector and the tracking controller. The track jumping device also comprises an acceleration device and a deceleration device for moving the light beam from a first track to an adjacent second track on the recording medium. Further, a forcible driver applies a drive signal to the moving device after the deceleration device completes to output the deceleration signal until the level of the tracking error signal is decreased below a predetermined value. Focus jumping is controlled similarly for an optical disk having a plurality of layered information planes.

An advantage of the present invention is that track jumping or focus jumping can be stably performed even if external disturbances exist in high speed reproduction or recording.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 4A–4F are diagrams of tracking error signal and tracking drive waveform in the embodiment;

DETAILED DESCRIPTION OF THE PREFERRED EMBODIMENTS

Figure 1A:
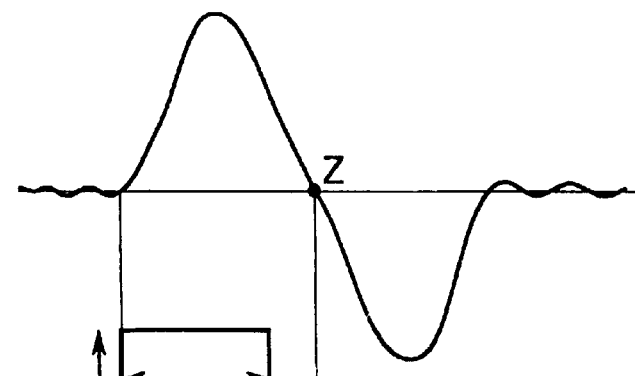
FIGS. 1A–1F are diagrams of tracking error signal and tracking drive waveform in prior art jumping in normal and abnormal situations due to eccentricity components.
Figure 1B:
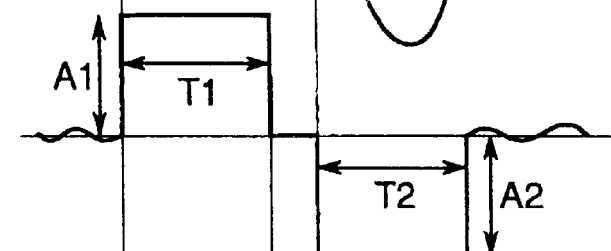
Figure 1C:
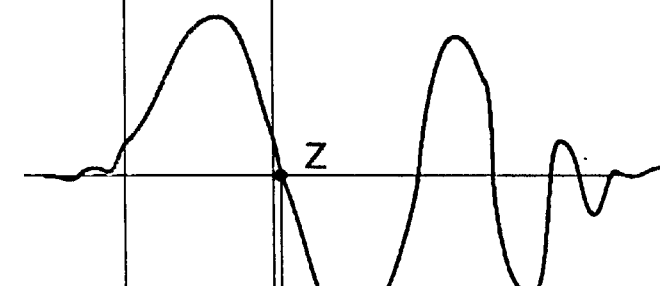
Figure 1D:
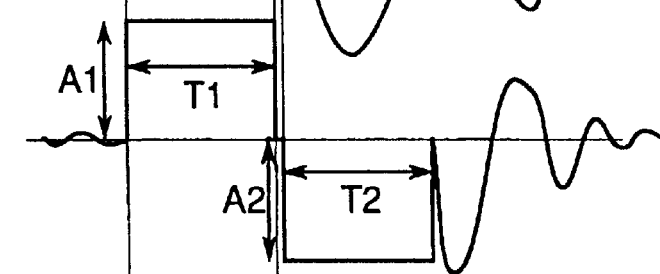
Figure 1E:
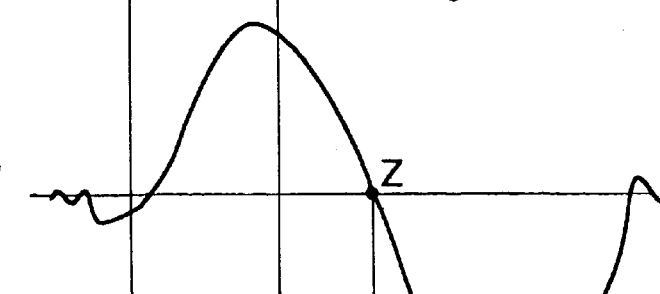
Figure 1F:
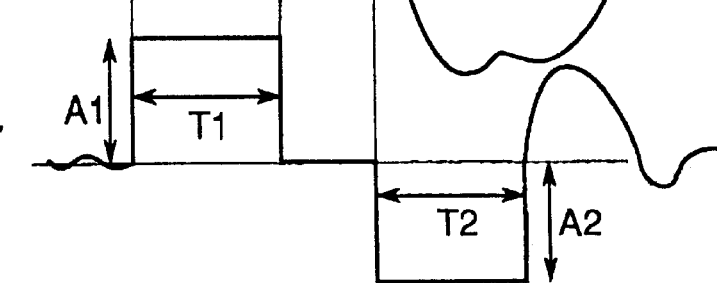
Figure 2:
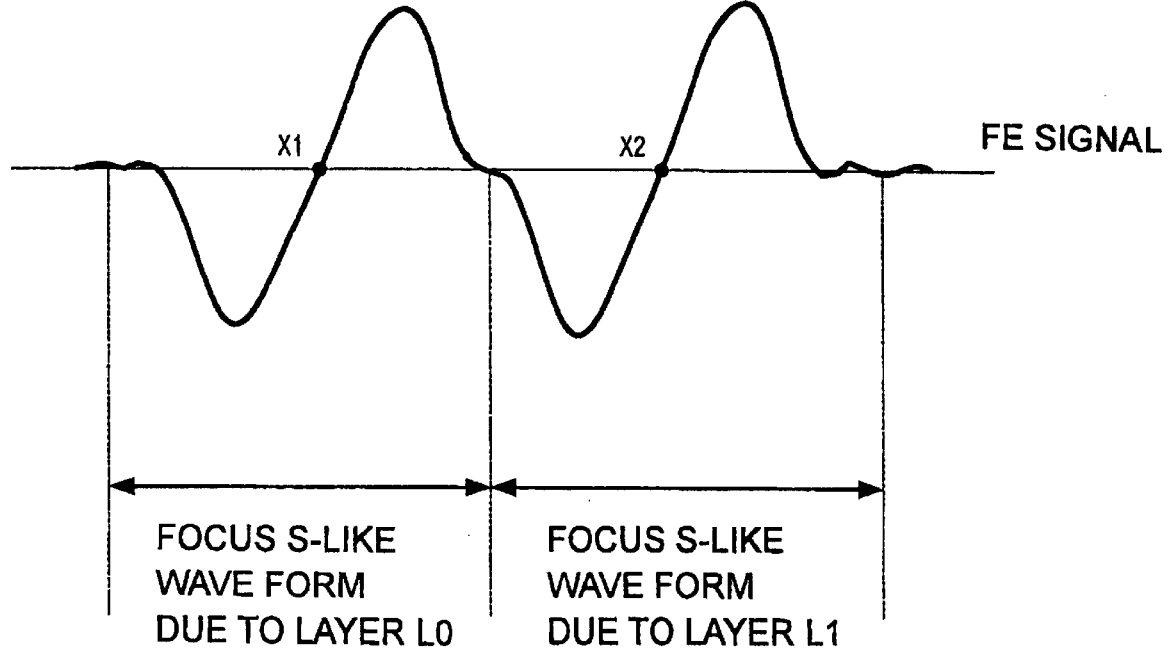
FIG. 2 is a diagram for explaining focus error signal in an optical disk having two information planes.
Figure 3:
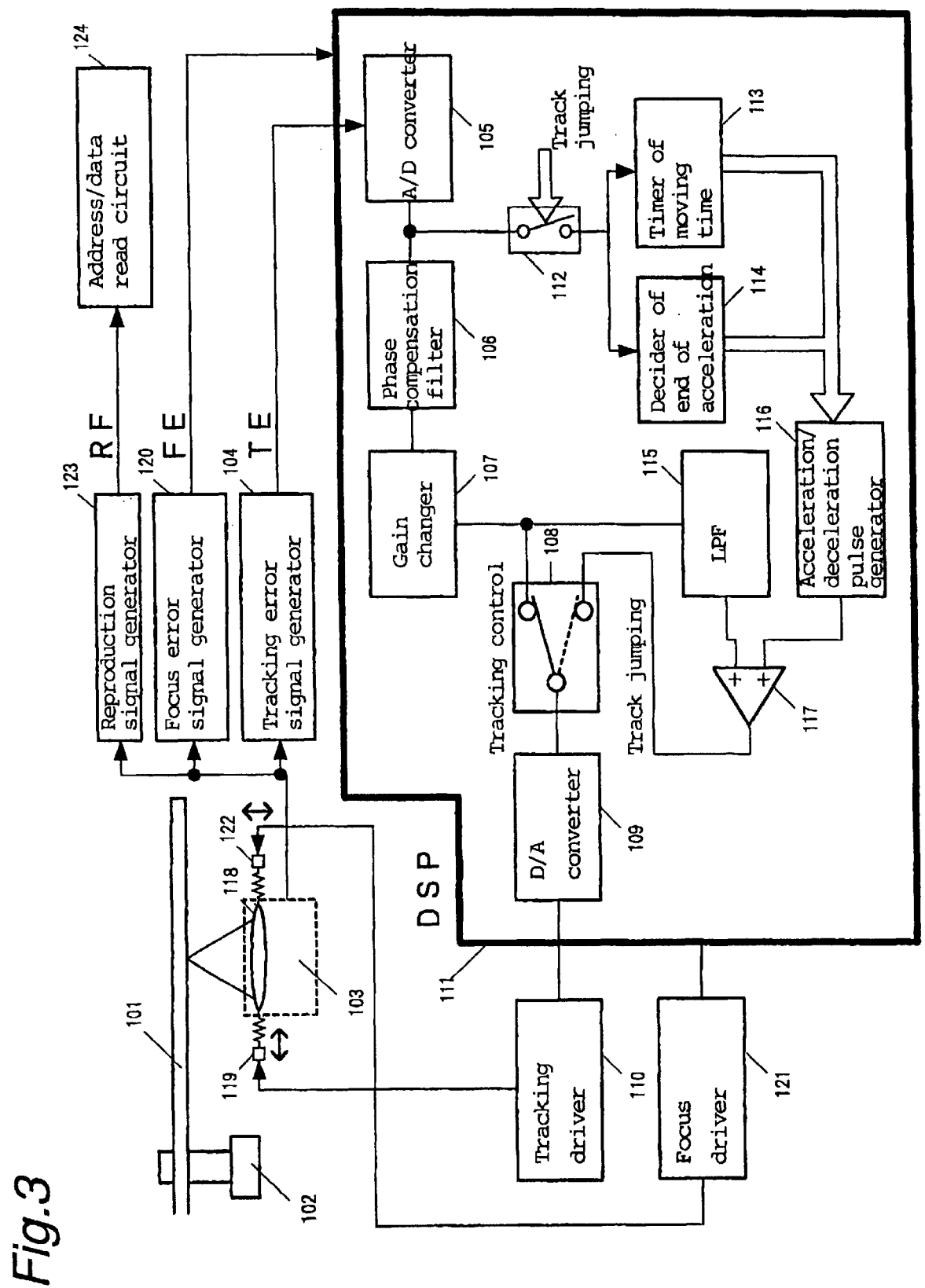
FIG. 3 is a block diagram of an optical recording and reproducing apparatus according to a first embodiment of the invention.

Referring now to the drawings, wherein like reference characters designate like or corresponding parts throughout the several views, FIG. 3 shows a structure of an optical recording and reproducing apparatus according to a first embodiment of the invention. The apparatus has a disk motor 102 for rotating an optical disk 101 at a predetermined revolution number, an optical head 103 for recording and reproducing information on the optical disk 101, and a traverse motor (not shown) which moves the entire optical head 103 perpendicularly to tracks on the optical disk 101. The optical head 103 includes a light source such as a laser diode, a coupling lens, a polarized beam splitter, a polarization plate, a focus lens 118, a condensing lens, a splitting mirror and photodetectors, and only the focus lens 118 is shown in FIG. 3 for the brevity of the illustration.

A light beam emitted by the optical head 103 is collimated by the coupling lens, is reflected by the polarized beam splitter and transmits the polarization plate. Then, it is focused by the focus lens 118 to form a focal position on the optical disk 101 in the direction of thickness. Thus, a light beam illuminates the optical disk 101 rotated by the disk motor 102 to form a light beam spot thereon. The reflecting light from the optical disk 101 transmits through the focus lens 118, the polarization plate, the polarized beam splitter and the condensing lens, and it is split by the splitting mirror in two directions. One of the split light beams is detected by a photodetector having two divided photo-detection areas in the optical head 103, and the signal outputted from the photodetector is entered to a focus controller, which comprises a focus error signal generator 120, a digital signal processor (DSP) 111, a focus driver 121 and a focus actuator 122. In the focus error signal generator 120, a position shift signal (focus error (FE) signal) which represents position shift between a focal position of the light beam and the optical disk 101 is detected based on the difference between the output signals of the photodetector. The focus control is performed based on the focus error signal so as to make the spot in the focal state in the optical disk 101. The detection technique of the focus error signal is called a SSD technique.

On the other hand, the other light beam split by the splitting mirror is detected by another photodetector having four divided photo-detection areas in the optical head 103, and the signal outputted from the photodetector is entered to a tracking controller, which comprises a tracking error signal generator 104, the digital signal processor (DSP) 111, a tracking driver 110 and a tracking actuator 119. In the tracking error signal generator 104, each of two diagonal sums obtained from the four divided photo-detection areas is binarized by a comparator, and is compared on the phase by a phase comparator. Then, a signal in correspondence to phase advance or delay is entered to a differential amplifier. An output signal of the differential amplifier represents a shift between the focal position of the light beam and a track. That is, the output signal is a tracking error (TE) signal used to control the light beam so as to keep the focal position of the light beam on a track, and it is entered to the digital signal processor 111. The detection technique of the tracking error signal is called as phase difference technique.

In the tracking control, the tracking actuator 119 moves the focus lens 118 in the radial direction of the optical disk 101. The tracking actuator 119 comprising a movable portion and a fixed portion, and the movable and fixed portions are connected with four wires or with elastic material such as rubber. By supplying a current to a coil provided in the movable portion, an electromagnetic force is generated between the coil and a permanent magnet provided in the fixed portion. The resultant electromagnetic force moves the focus lens in the radial direction of the optical disk or perpendicularly to the tracks.

In track jumping, a drive signal (acceleration or deceleration pulse) is generated by an acceleration/deceleration pulse generator 116 to be supplied to the tracking actuator 119 through an adder 117. In the search of a specified information track, the tracking operation is stopped, and the entire optical head 103 including the tracking actuator 119 is moved in the radial direction of the optical disk 101 while counting the number of tracks on the optical disk 101 over which the light beam crosses. When the number of tracks to the specified track is a few, in order to surely and stably arrive at the specified track, a pulse for acceleration or deceleration is applied to the tracking actuator 119 while stopping the tracking, and the track jumping to move to an adjacent track is repeated.

The digital signal processor 111 has a switch 108. When the tracking control is necessary or when recording/reproduction mode is set in the optical recording and reproduction apparatus, the switch 108 is set to a position displayed with a solid line. Further, another switch 112 is opened. When the track jumping to an adjacent track is necessary on search, the switch 108 is set to a position displayed with a dashed line. That is, the switch 108 changes a drive signal to be applied to the tracking actuator 119 between tracking control (recording/reproduction mode) and track jumping. Further, the switch 112 is closed on track jumping.

First, the recording/reproduction mode is explained. The tracking error signal received by the digital signal processor 111 is converted by an analog-to-digital (AD) converter 105 to a digital signal, which is received by a phase compensation filter 106 comprising an adder, a multiplier and a delay. The filter 106 compensates the phase in the tracking control system. The tracking error signal compensated on the phase by the phase compensation filter 106 is entered to the switch 108 through a gain changer 107 which changes a loop gain of the tracking control system. Because the switch 108 is set to the position shown with the solid line in the recording/reproduction mode, the tracking error signal which transmits through the switch 108 is converted from a digital signal to an analog signal and is entered to the tracking driver 110. In the tracking driver 110, the tracking control signal is suitably subjected to current amplification and level conversion so as to drive the tracking actuator 119. As explained above, the tracking control system comprises the tracking error signal generator 104, the AD converter 105, the phase compensation filter 106, the gain changer 107, a digital-to-analog (DA) converter 109, the tracking driver 110, and the tracking actuator 119. The tracking actuator 119 is driven for the focal spot of the light beam on the optical disk 101 to scan a predetermined track. Thus, the tracking is controlled.

When the focal spot of the beam scans a track, a traverse motor (not shown) is driven at the same time so as to make the focal spot coincide with the center of the focus lens 118. Thus, the optical axis of the light beam onto the optical disk 101 agrees with that of the focus lens 118. This traverse control is not explained here further.

When the focus control and the tracking control are performed on an optical disk 101, a reproduction signal generator 123 detects the reflection light from the optical disk 101 with a photodetector in the optical head 103 and generates reproduction RF signals. An address/data read circuit 124 read an address/data from the RF signals. In a recording system (not shown in FIG. 3), a recording circuit generates record signals based on data to be recorded, and a record signal generator generates a drive signal. The optical head 103 receives the drive signal and generates a light beam for writing the data to an optical disk. The above-mentioned recording and reproducing systems are known, and further explanation is omitted here.

Figure 5:
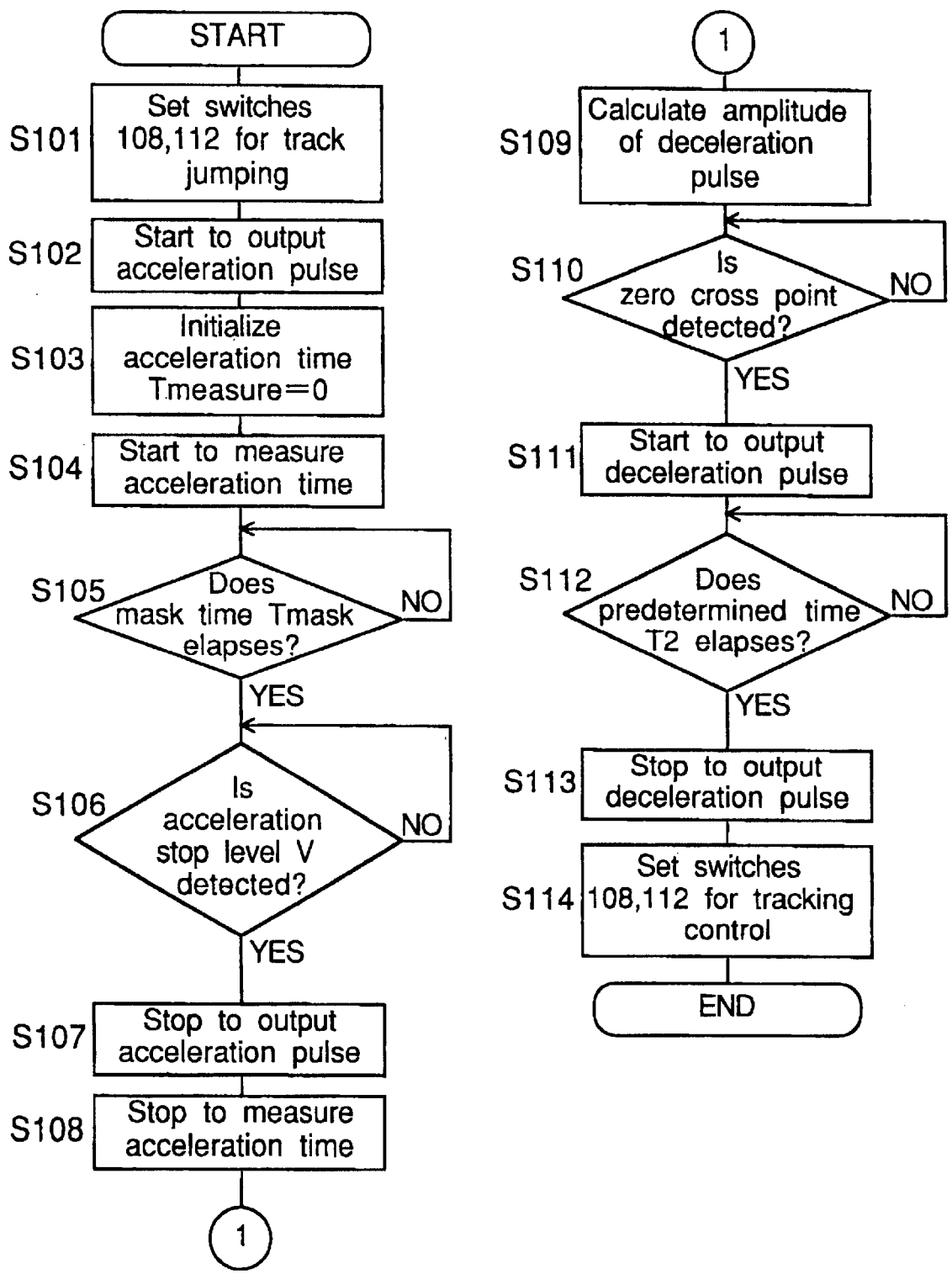
FIG. 5 is a flowchart of track jumping in the embodiment.

Next, track jumping in this embodiment is explained with reference to waveforms shown in FIGS. 4A–4F and to a flowchart of the digital signal processor 111 shown in FIG. 5, beside the block diagram shown in FIG. 3. FIGS. 4A–4F show waveforms on track jumping in a direction to the inner of optical disk 101. FIGS. 4A and 4B show tracking error signal and tracking drive waveform in normal situations, FIGS. 4C and 4D show tracking error signal and tracking drive waveform when the moving speed becomes fast due to external disturbances, while FIGS. 4E and 4F show counterparts when the moving speed becomes slow due to external disturbances. Track jumping in the opposite direction to the outer peripheral of optical disk is similar except that the polarities of the tracking error signal and the tracking drive waveform, and the waveforms and the explanation thereon are omitted here.

In track jumping, the acceleration/deceleration pulse generator 116 generates an acceleration or deceleration pulse to activate the tracking actuator 119 through an adder 117. For track jumping, the digital signal processor 111 has a switch 112, a timer 113 for measuring moving time and a decider 114 for deciding completion of acceleration. The switch 108 is set to "off" position on tracking control (or in recording/reproduction mode), while the switch 112 is opened. When track jumping is started, the switch 108 is set to "on" position, and the switch 112 is closed. The tracking error signal digitalized by the AD converter 105 in the digital signal processor 111 is sent through the switch 112 to the timer 113 and the decider 114 in order to control the acceleration/deceleration pulse generator 116. On the other hand, the tracking error (TE) signal is subjected to gain change by a gain changer 107 and to pass the low pass filter (LPF) 115. The signal is added next at the adder 117 with a pulse signal for acceleration/deceleration supplied by the acceleration/deceleration pulse generator 116, and the sum signal is applied to the tracking actuator 119. Because the cut-off frequency of the low pass filter 115 is set low to pass components due to eccentricity of the optical disk 101 sufficiently, the low frequency components of the tracking error signal (eccentricity components) are added to the pulse signal for acceleration/deceleration, and the sum signal is used to drive the tracking actuator 119. Thus, the unstableness of track jumping due to the eccentricity components is decreased. Further, as will be explained later in detail, the level of the tracking error signal is decided when acceleration is completed, and when the moving speed is found to become fast or slow, waveform (amplitude or time) of the deceleration signal is changed.

Next, track jumping control is explained with reference to the flowchart shown in FIG. 5 of track jumping control of the digital signal processor 111 in this embodiment. First, the switch 108 is set to "on" position for track jumping as shown in FIG. 3 with a dashed line, and the switch 112 is closed (S101). Next, an acceleration pulse (of a predetermined amplitude A1) generated by the acceleration/deceleration pulse generator 116 begins to be outputted (S102). Then, the optical head 103 begins to be moved in the radial direction towards the center of the optical disk 101. Then, sinusoidal-like tracking error signal appears. The setting of the amplitude A1 is explained later. At the same time as the generation of the acceleration pulse, the timer 113 initializes acceleration time $T_{measure}$ (S103), and the measurement of moving time is started (S104). As shown in FIGS. 4A–4F, there are two points P1 and P2 at which the tracking error signal agrees with the acceleration stop level V during the acceleration. In order to detect not point P1, but point P2, it is waited until mask period $T_{mask}$ elapses. That is, after it is confirmed that mask period $T_{mask}$ elapses (S105), the decider 114 detects that the tracking error signal decreases below the acceleration stop level (S106). The mask period $T_{mask}$ is set to a period which makes it possible to detect not P1, but P2 surely even the apparatus are subjected to external disturbances. Then, the generation of the acceleration pulse is stopped (S107) and the measurement of acceleration period $T_{measure}$ is completed (S108). Next, the amplitude A3 of deceleration pulse is determined according to the acceleration period $T_{measure}$ measured above as follows (S109).

$$A3=A2*(T1/T_{measure}), \quad (1)$$

wherein A2 represents standard amplitude of deceleration pulse and T1 represents standard acceleration period. The setting of A2 and T1 is explained later.

Next, it is waited to detect zero cross point (point Z in FIGS. 4A–4F) of tracking error signal (S110). The zero cross point is detected as a cross point between the tracking error signal outputted by the gain changer 107 and the output signal of the low pass filter 115. Then, it is started to output the deceleration pulse having the amplitude determined according to Eq. (1) (S111). When it is decided that the deceleration pulse is outputted for a predetermined period T2 (S112), the generation of the deceleration pulse is stopped (S113). The setting of T2 is explained later. Then, the switch 108 is set to "off" position for track jumping as shown in FIG. 3 with a solid line, and the switch 112 is opened (S114). Thus, the track jumping is completed, and the tracking control is started again.

Next, the setting of amplitude A1 of acceleration pulse, standard amplitude A2 of deceleration pulse, standard acceleration period T1 and deceleration period T2 is explained. In normal situations where no external disturbances such as vibrations are applied to the apparatus, A1, A2 and T2 are determined according to the sensitivity of the tracking actuator 119 so that stable track jumping can be performed. The standard acceleration period T1 is from the start of the acceleration to the point P2 at which the tracking error signal under acceleration becomes the acceleration stop level V. By setting the mask period $T_{mask}$ to about a half of the standard acceleration period T1, point P2 can be surely detected instead of point P1 when the apparatus is affected by external vibrations.

As explained above, the acceleration is performed not for a predetermined period, but until point P2 is detected. Then, even when the moving speed of the optical head 103 is affected by external disturbances, the position thereof after the movement can be kept constant invariably. Further, the speed fluctuation around the zero cross point (point Z) is canceled by increasing the amplitude of the deceleration pulse for a fast moving speed (acceleration period<standard acceleration period T1) and by decreasing the amplitude of the deceleration pulse for slow a moving speed (acceleration period>standard acceleration period T1), so that the position and the moving speed of the optical head 103 are kept constant invariably after the deceleration is completed. Then, stable track jumping can be realized by the above-mentioned control against external disturbances on the position and the speed of the optical head 103.

Though the amplitude of deceleration pulse is changed according to the measured acceleration period in the above-mentioned embodiment, a similar advantage can be realized by changing the deceleration period under the same amplitude of the deceleration pulse according to the acceleration period $T_{measure}$. When the moving speed is fast ($T_{measure}$<T1), the acceleration period is increased longer than standard deceleration period, while when the moving speed is slow ($T_{measure}$>T1), the acceleration period is decreased shorter than the standard deceleration period.

Figure 6:
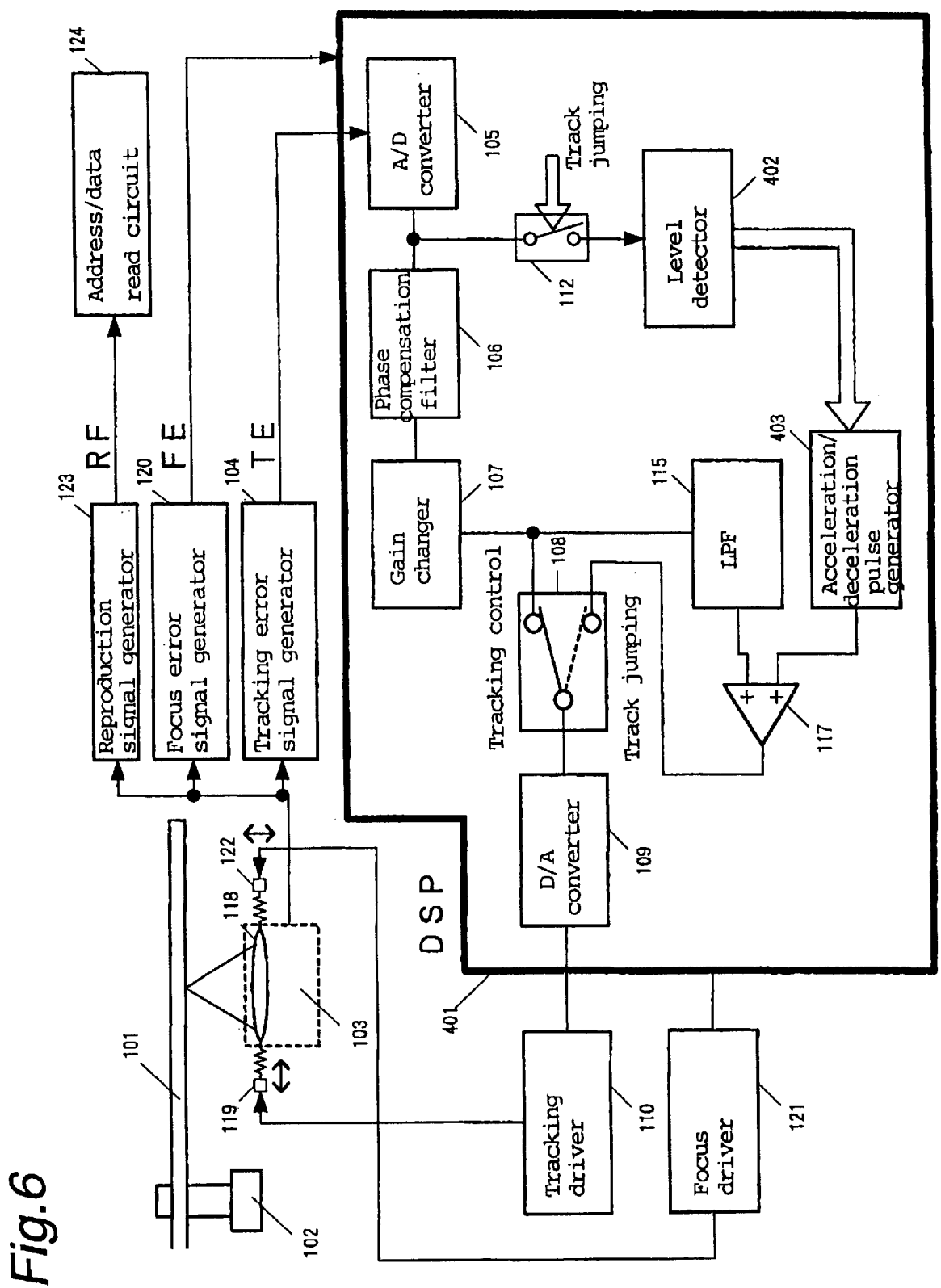
FIG. 6 is a block diagram of an optical recording and reproducing apparatus according to a second embodiment of the invention.

Next, an optical recording and reproducing apparatus of a second embodiment of the invention is explained. FIG. 6 is a block diagram of the optical recording and reproducing apparatus. The timer 113 and the decider 114 in the apparatus of the first embodiment shown in FIG. 3 are omitted, while a level detector 402 is added in order to detect the level of tracking error signal when the generation of deceleration pulse is completed. Further, an acceleration/deceleration pulse generator 403 generates acceleration and deceleration pulses as explained below. The components included in the apparatus of the first embodiment have the like reference numbers in FIG. 6, and the explanation thereon is omitted here.

For track jumping, the digital signal processor 401 has a switch 112, a level detector 402 and the acceleration/deceleration pulse generator 403. The switch 112 is set to "off" position on tracking control. When track jumping is started, the switch 112 is set to "on" position. Further, the switch 112 is also closed, and the tracking error signal digitalized by the AD converter 105 in the digital signal processor 401 is sent to the level detector 402. Then, the acceleration/deceleration pulse generator 403 generates an acceleration or deceleration pulse to activate the tracking actuator 119.

On track jumping, a drive signal (acceleration pulse or deceleration pulse) is generated by a pulse generator 403 to move the optical head 103 by the tracking actuator 119 in the radial direction of an optical disk. In order to move the light beam across tracks, the acceleration pulse is applied to the tracking actuator 119 until a predetermined point between two tracks. Next, in order to decelerate the accelerated light beam, a variable deceleration pulse is added. After the deceleration pulse has been outputted, the tracking actuator 119 is driven forcibly until the tracking error signal decreased below a predetermined value.

Figure 7:
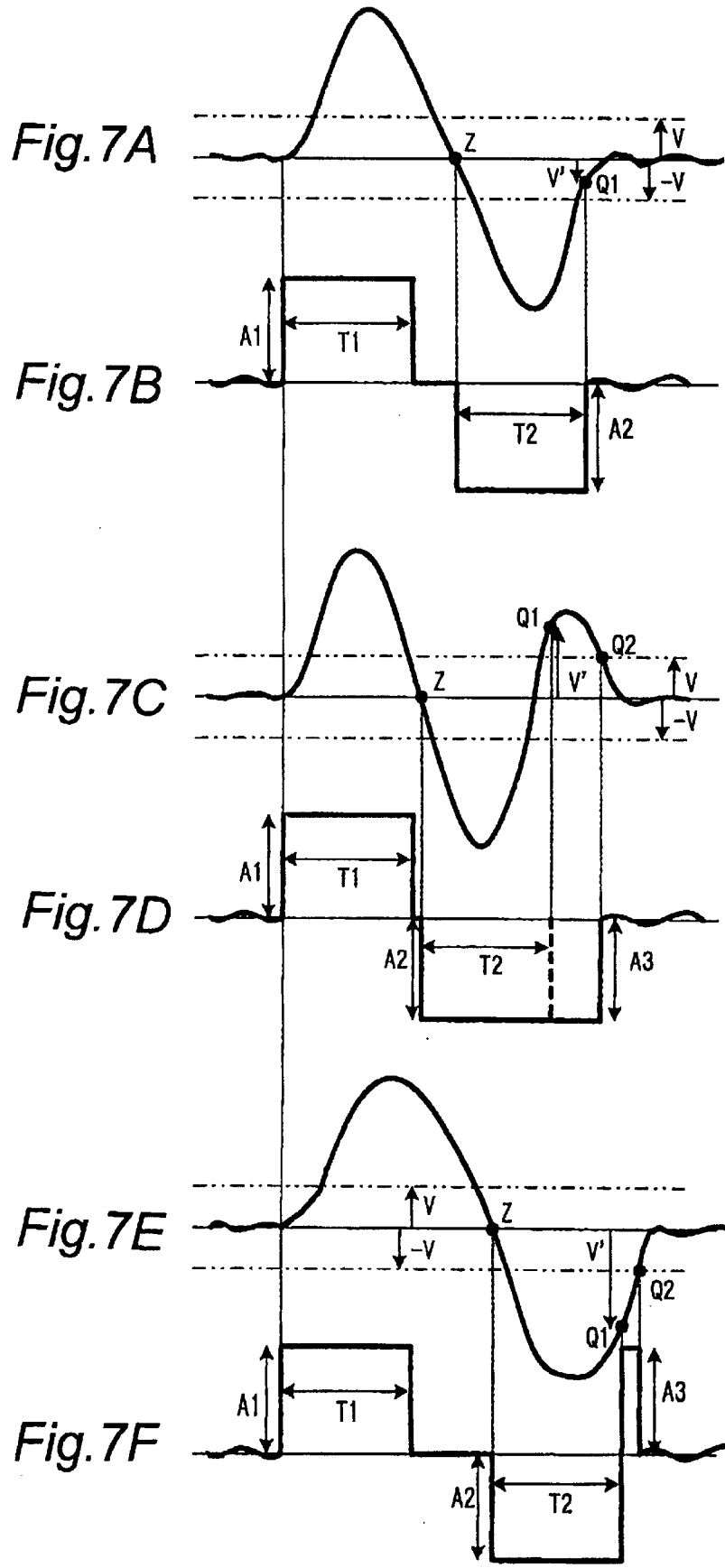
FIGS. 7A–7F are diagrams of tracking error signal and tracking drive waveform in the embodiment.

Next, track jumping in this embodiment is explained with reference to the waveforms shown in FIGS. 7A–7F and to a flowchart of the digital signal processor 401 shown in FIG. 8 beside the block diagram shown in FIG. 6. FIGS. 7A–7F show waveforms on track jumping in a direction to the inner track. FIGS. 7A and 7B show tracking error signal and tracking drive waveform in normal situations, FIGS. 7C and 7D show tracking error signal and tracking drive waveform when the moving speed becomes fast due to external disturbances, while FIGS. 7E and 7F show counterparts when the moving speed becomes slow due to external disturbances. Track jumping in the opposite direction to the outer peripheral of optical disk is similar except that the polarities of the tracking error signal and the tracking drive waveform, and the waveforms and the explanation thereon are omitted.

Figure 8:
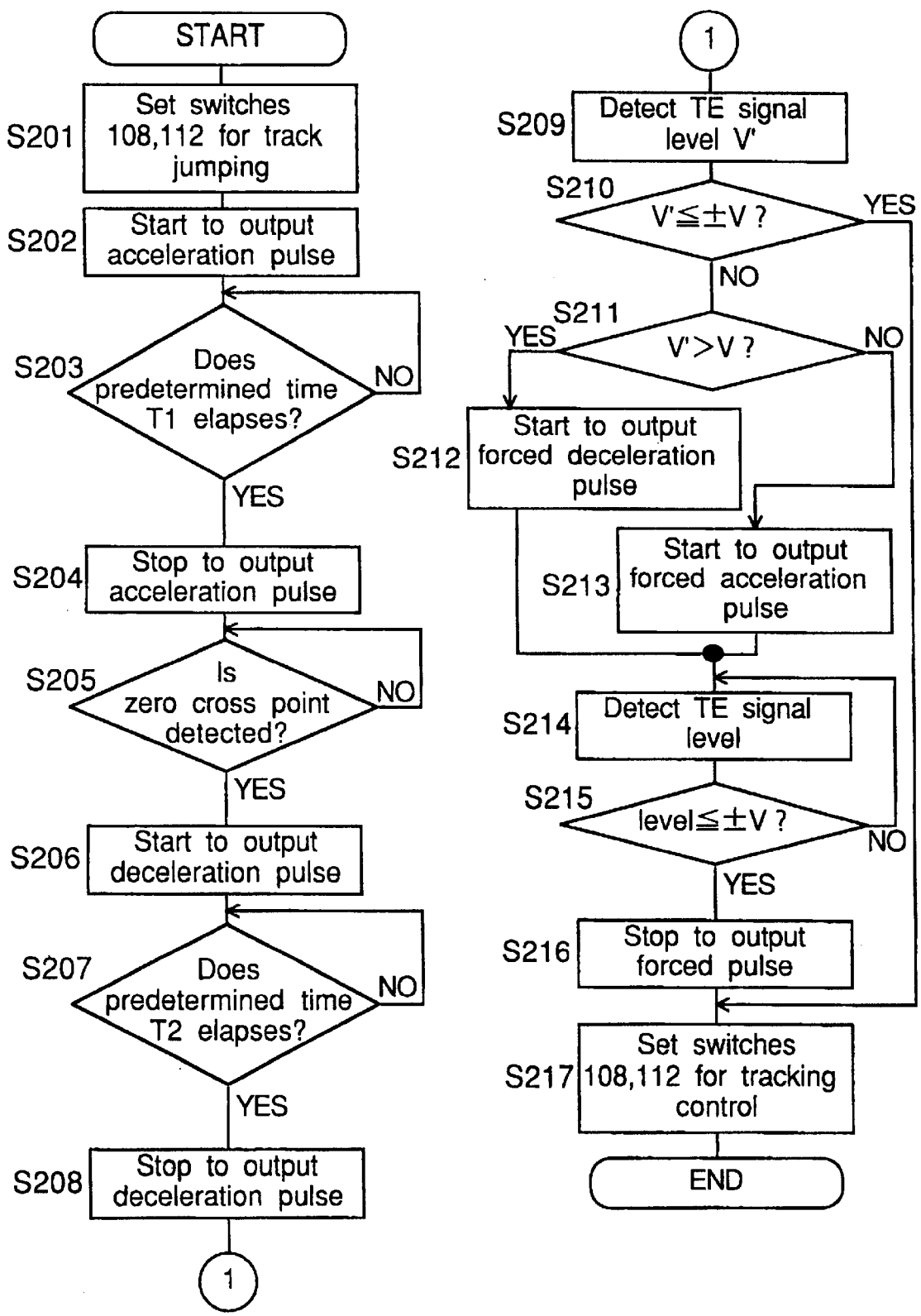
FIG. 8 is a flowchart of track jumping in the embodiment.

FIG. 8 shows the flowchart of track jumping in this embodiment. First, the switch 108 is set to "on" position for track jumping as shown in FIG. 6 with a dashed line, and the switch 112 is closed (S201). Next, an acceleration pulse (of a predetermined amplitude A1) generated by the acceleration/deceleration pulse generator 403 begins to be outputted (S202). Then, the optical head 103 begins to be moved in a direction radially inward of the optical disk 101, and a sinusoidal-like tracking error signal appears. After a predetermined period T1 elapses (S203), the generation of acceleration pulse is stopped (S204). Next, it is waited that a zero cross point (point Z in FIGS. 7A–7F) of tracking error signal is detected (S205). The zero cross point is detected as a cross point between the tracking error signal outputted by the gain changer 107 and the output signal of the low pass filter 115. Next, the generation of deceleration pulse (of predetermined amplitude A2) is started (S206), and after a predetermined period T2 elapses (S207), the generation of deceleration pulse is stopped (S208). The amplitudes A1, A2 and the periods T1 and T2 are determined according to the sensitivity of the tracking actuator 119 so that stable track jumping can be performed in normal situations where no external disturbances such as vibrations are applied to the apparatus.

Next, the level detector 402 detects the tracking error signal level V' (level Q1 in FIGS. 7A, 7C and 7E) when the generation of the deceleration pulse is stopped (S209), and the detected level V' is compared with standard level V (S210). The standard level V is set in a range where stable tracking can be realized according to frequency characteristics of the tracking control system. For example, the range is less than a fourth of tracking pitch, say 20%. If the detected level V' is within a predetermined range (±V) (YES at S210), the flow proceeds to step S217, and the switch 108 is set to "off" position and the switch 112 is opened for tracking control. Thus, the track jumping in the direction to the inner is stopped, and the tracking control is started again.

When the moving speed of the optical head 103 becomes fast due to external disturbances (V'>V) (YES at S211), as shown in FIG. 7C, deceleration is insufficient when the generation of the deceleration pulse is completed, and the optical head 103 passes an object position for tracking control. In this case, another deceleration pulse (or forced deceleration pulse) of predetermined amplitude A3 is started to be outputted to force the tracking actuator 119 to decelerate (S212). Then, the tracking error signal is detected (S214), and it is waited that the level of tracking error signal is within the absolute value of V (S215) or at point Q2 in FIG. 7C.

On the other hand, When the moving speed of the optical head 103 becomes slow due to external disturbances (V'<−V) (NO at S211), as shown in FIG. 7E, deceleration is excessively performed when the generation of the deceleration pulse is completed, and the optical head 103 does not reach the object position for tracking control. In this case, another acceleration pulse (or forced acceleration pulse) of predetermined amplitude A3 is started to be outputted to force the tracking actuator 119 to accelerate (S213). Then, the tracking error signal is detected (S214), and it is waited that the level of tracking error signal is within the absolute value of V (S215) or at point Q2 in FIG. 7E. When the tracking error signal is decreased below the absolute value of V, the generation of the forced acceleration or deceleration pulse is stopped (S216). Then, the switch 108 is set to "off" position for track jumping as shown in FIG. 6 with a solid line, and the switch 112 is opened (S217). Thus, the track jumping is completed, and the tracking control is started again.

As explained above, the level of tracking error signal is detected when deceleration is completed, and when the level of the tracking error signal is not within the predetermined range, the tracking actuator 119 is driven forcibly until the level enters the predetermined range. Then, track jumping becomes stable against external disturbances.

In the above-mentioned embodiment, the forced acceleration or deceleration pulse is applied to the tracking actuator 119. Alternatively, the amplitude of the forced acceleration or deceleration pulse is changed according to the level of the tracking error signal detected at step S209 or S214, so that the moving speed of the optical head 103 is kept constant when the generation of the forced pulse is stopped, and it is possible to secure higher performance on tracking.

Figure 9:
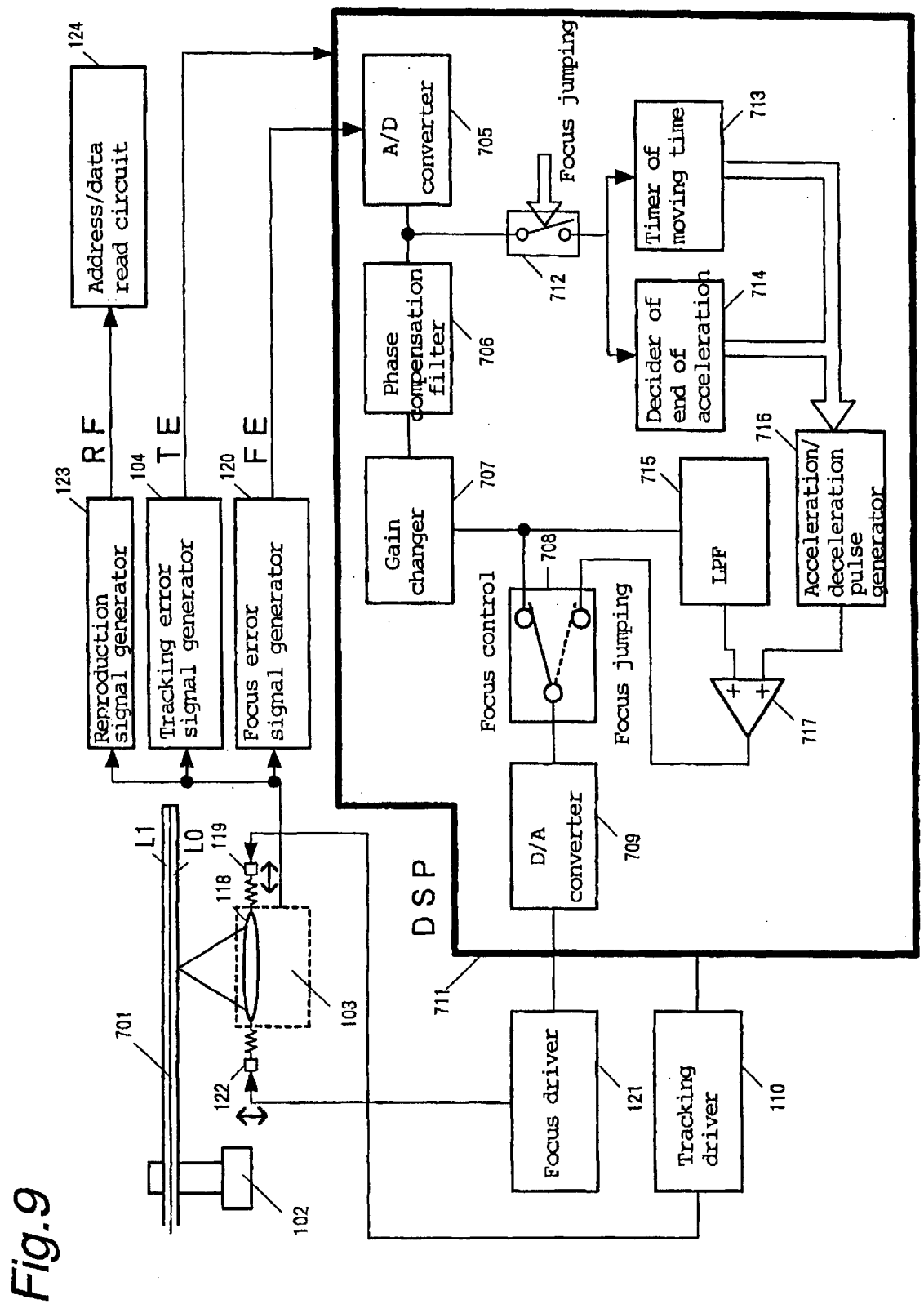
FIG. 9 is a block diagram of an optical recording and reproducing apparatus according to a third embodiment of the invention.

Next, an optical recording and reproducing apparatus of a third embodiment of the invention is explained. This embodiment relates to focus jumping between a adjacent information planes for an optical disk 701 having a plurality of information planes, with a technique similar to the above-mentioned track jumping. FIG. 9 is a block diagram of the optical recording and reproducing apparatus. The components included in the apparatus of the first embodiment have like reference numbers in FIG. 9, and the explanation thereon is omitted here. It is assumed here that an optical disk 701 has two information planes, plane L0 near the optical head 103 and the other plane L1. However, the embodiment is also applicable to an optical disk having three or more information planes.

In the optical head 103, one of the light beams divided in two directions by a splitting mirror (not shown) is entered to the tracking controller, as explained above, for tracking control and track jumping control. The other of the light beams is detected by a photodetector having two divided areas and entered to a focus controller. The focus controller comprises a focus error signal generator 120, a digital signal processor (DSP) 711, a focus driver 121 and a focus actuator 122. In the focus error signal generator 120, the output signal of the photodetector is sent to a differential amplifier. The output signal of the differential amplifier is a position shift signal (focus error (FE) signal) on the focus position of the light beam and an optical disk 701, and it is entered to the digital signal processor 711. The focus control is performed based on the focus error signal so as to position the focal position on the optical disk. The detection technique of the focus error signal is called as SSD technique.

On the other hand, the other light beam split by the mirror is detected by another photodetector having having four divided photo-detection areas in the optical head 103, and the signal outputted from the photodetector is entered to a tracking controller, which comprises a tracking error signal generator 104, the digital signal processor (DSP) 711, a tracking driver 110 and a tracking actuator 119. In the tracking error signal generator 104, each of two diagonal sums obtained from the four divided photo-detection areas is binarized by a comparator, and is compared on the phase by a phase comparator. Then, a signal in correspondence to phase advance or delay is entered to a differential amplifier. An output signal of the differential amplifier represents a shift between the focal position of the light beam on the optical disk 701 and a track. That is, the output signal is a tracking error (TE) signal which is used to control the light beam so as to scan the focal position of the light beam on a track, and it is entered to the digital signal processor 711. The detection technique of the tracking error signal is called a phase difference technique.

The digital signal processor 711 has a switch 708 which is set to a position for focus control as shown with a solid line in FIG. 9 or to the other position for focus jumping as shown with a dashed line. Another switch 712 is opened on focus control and closed on focus jumping. Therefore, the switch 708 activates the focus control system or the focus jumping control system. A drive signal applied to the focus actuator 122 is changed between the focus control system or the focus jumping control system. On focus jumping, the focus error signal supplied from the AD converter 705 is sent to the timer 713 for measuring moving time and the decider 714 which decides end of acceleration.

First, focus control is explained. The focus error signal received by the digital signal processor 711 is converted to digital signal by the AD converter 705 and is sent to a phase compensation filter 706 that is a digital filter having an adder, a multiplier and a delay. The phase compensation filter 706 compensates the phase in the focus control system. Then, the focus error signal outputted by the phase compensation filter 706 is sent to the switch 708 through a gain changer 707 which changes a loop gain of the focus control system. On focus control, the focus error signal passes the switch 708 and is converted by a digital-to-analog converter 709 to an analog signal, which is received by a focus driver 121. The focus driver 121 performs current amplification and level conversion on the focus control signal for driving the focus actuator 122. Then, the focus actuator 122 is driven to keep the light beam on the optical disk 701 constantly in a predetermined focus state. Thus, the focus is controlled as explained above.

Figure 10A:
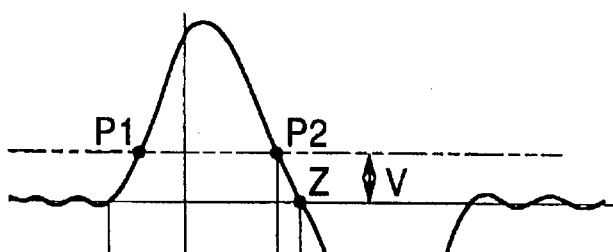
FIGS. 10A–10F are diagrams of focus error signal and focus drive waveform in the embodiment.
Figure 10B:
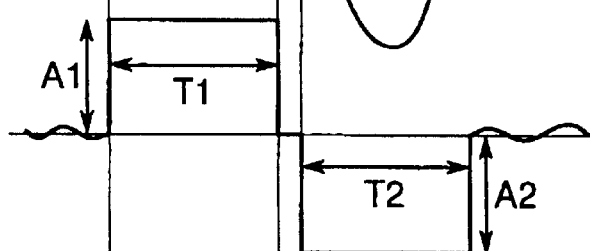
Figure 10C:
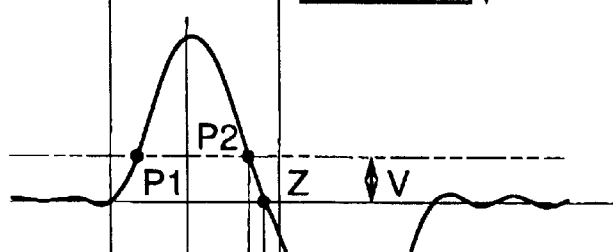
Figure 10D:
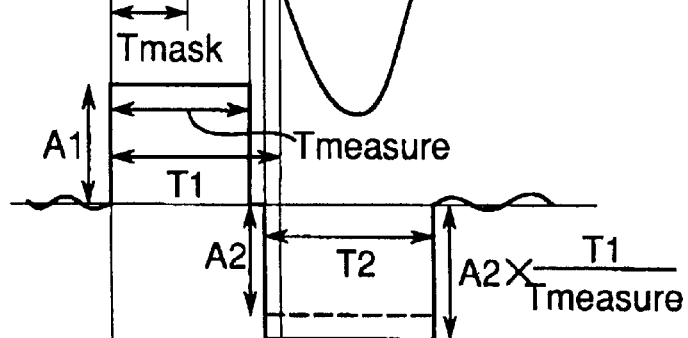
Figure 10E:
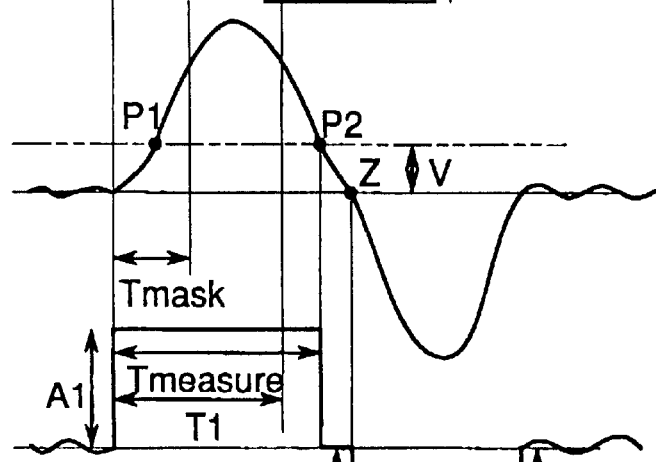
Figure 10F:

Next, focus jumping in this embodiment is explained with reference to waveforms shown in FIGS. 10–10F and to a flowchart shown in FIG. 11 of the digital signal processor 711, beside the block diagram shown in FIG. 9. FIGS. 10A–10F show waveforms on focus jumping from a first information plane L0 to a second one L1 in an optical disk having a plurality of information planes. FIGS. 10A and 10B show focus error signal and focus drive waveform in normal situations, FIGS. 10C and 10D show focus error signal and focus drive waveform when the moving speed becomes fast due to external disturbances, while FIGS. 10E and 10F show counterparts when the moving speed becomes slow due to external disturbances. Focus jumping in the opposite direction from information plane L1 to L0 is similar except that the polarities of the focus error signal and the focus drive waveform, and the waveforms and the explanation thereon are omitted.

In focus jumping, the acceleration/deceleration pulse generator 716 generates an acceleration or deceleration pulse to activate the focus actuator 122 to move the optical head 103 vertically to an optical disk 701. In order to move the light beam from plane L0 to L1 in the optical disk 701, an acceleration signal to the focus actuator 122 is added until the light beam moves to an intermediate position between the two planes (for example, near a boundary between the two layers or an intermediate layer between them). Next, in order to decelerate the accelerated light beam, a variable deceleration signal is applied to the focus actuator 122. A period from the start of the movement of light beam to the predetermined, intermediate point between the two layers L0 and L1 is measured, and waveform (amplitude or period) of the deceleration signal is changed according to the measured moving time of the beam.

For focus jumping, the digital signal processor 711 further comprises a switch 712, a timer 713 for measuring moving time and a decider 714 for deciding end of acceleration. The switch 708 is set to "off" position on focus control, while the switch 712 is opened. When focus jumping is started, the switch 708 is set to "on" position, and the switch 712 is also closed. The focus error signal digitalized by the AD converter 705 in the digital signal processor 711 is sent through the switch 712 to the timer 713 and the decider 714 in order to control the acceleration/deceleration pulse generator 716. On the other hand, the focus error (FE) signal is subjected to gain change by a gain changer 707 and to pass the low pass filter (LPF) 715. The signal is added next at the adder 717 with a pulse signal for acceleration/deceleration supplied by the acceleration/deceleration pulse generator 716, and the sum signal is applied to the focus actuator 122. The cut-off frequency of the low pass filter 715 is set low to pass eccentricity components of the optical disk 701 sufficiently. Thus, the low frequency components of the focus error signal (vibration components) are added at the adder 717 to the pulse signal for acceleration/deceleration, and the sum signal is used to drive the focus actuator 122.

Figure 11:
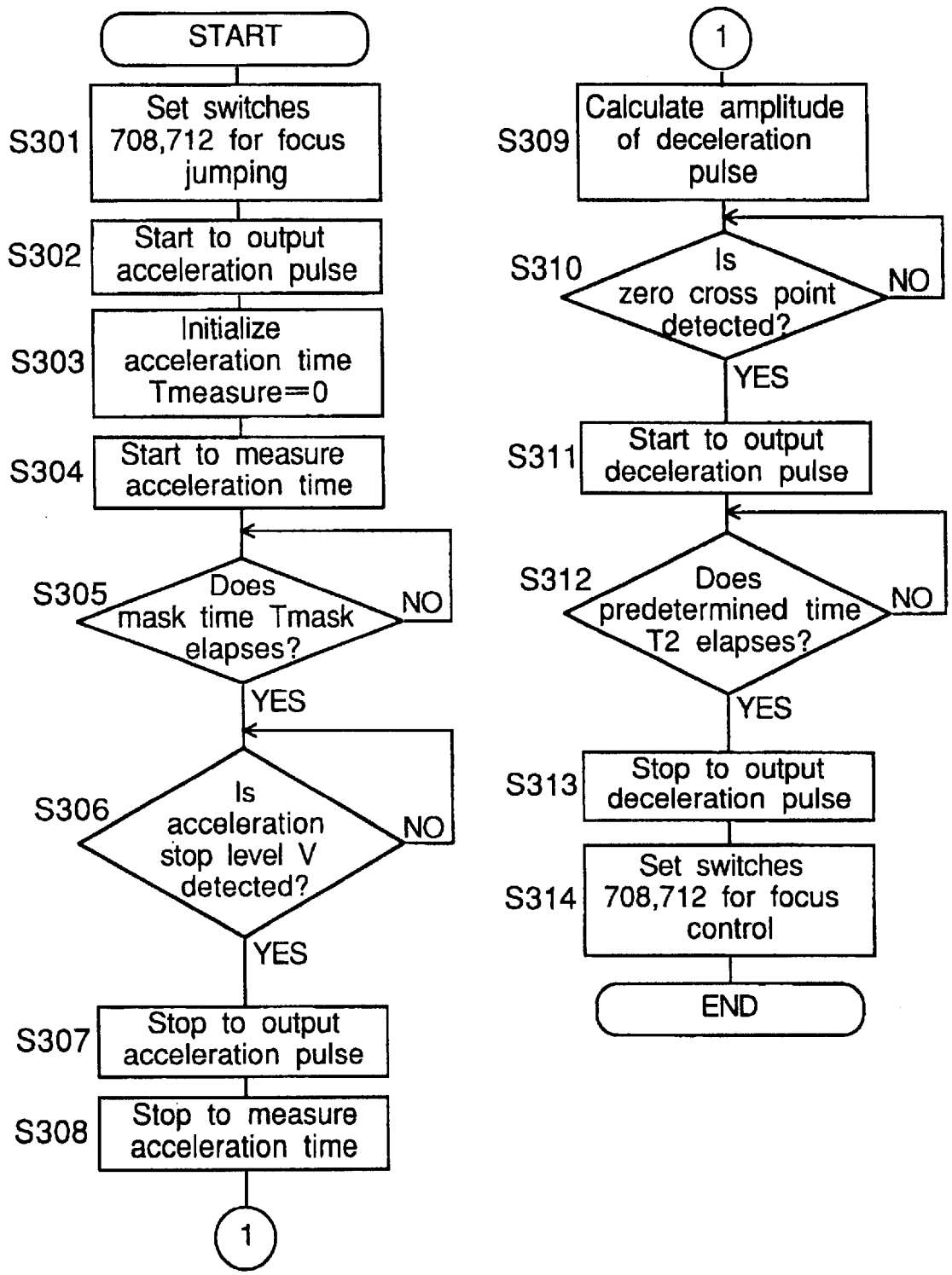
FIG. 11 is a flowchart of focus jumping in the embodiment.

FIG. 11 shows a flowchart of focus jumping control of the digital signal processor 711 in this embodiment. First, the switch 708 is set to "on" position for focus jumping as shown in FIG. 9 with a dashed line, and the switch 712 is closed (S301). Next, an acceleration pulse (of a predetermined amplitude A1) generated by the acceleration/ deceleration pulse generator 716 begins to be outputted (S302). Then, the optical head 103 begins to be moved in a direction perpendicular to the optical disk 101 from plane L0 to L1. Then, a sinusoidal-like focus error signal appears. The setting of the amplitude A1 is explained later. At the same time as the generation of the acceleration pulse is started, the timer 713 initializes acceleration period $T_{measure}$ (S303), and the measurement of moving time is started (S304). As shown in FIGS. 10A–10F, there are two points P1 and P2 at which the focus error signal agrees with the acceleration stop level V. Then in order not to detect point P1, it is waited until mask period $T_{mask}$ elapses. That is, after it is confirmed that mask period $T_{mask}$ elapses (S305), the decider 714 detects that the focus error signal decreases below acceleration stop level (S306). The mask period $T_{mask}$ is set to a period which makes it possible to surely detect not P1, but P2 even if the apparatus has external disturbances. Then, the generation of the acceleration pulse is completed (S307) and the measurement of acceleration period $T_{measure}$ is completed (S308). Next, the amplitude A3 of deceleration pulse is determined according to the acceleration period $T_{measure}$ measured above as follows (S309).

$$A3=A2* (T1/T_{measure}), \tag{2}$$

wherein A2 represents standard amplitude of deceleration pulse and T1 represents standard acceleration period. The setting of A2 and T1 is explained later.

Next, it is waited to detect a zero cross point (point Z in FIGS. 10A–10F) of the focus error signal (S310). The zero cross point is detected as a cross point between the focus error signal outputted by the gain changer 707 and the output signal of the low pass filter 715. Then, the deceleration pulse having the amplitude determined according to Eq. (2) is started to be outputted (S311). When it is decided that the deceleration pulse is outputted for a predetermined period T2 (S312), the generation of the deceleration pulse is completed (S313). The setting of T2 is explained later. Then, the switch 708 is set to "off" position for focus jumping as shown in FIG. 9 with a solid line, and the switch 712 is opened (S314). Thus, the focus jumping to the adjacent information plane L1 is completed, and the focus control is started again.

Next, the setting of amplitude A1 of acceleration pulse, standard amplitude A2 of deceleration pulse, standard acceleration period T1 and deceleration period T2 is explained. In normal situations where no external disturbances such as vibrations are not applied to the apparatus, A1, A2 and T2 are determined according to the sensitivity of the focus actuator 122 so that stable focus jumping can be performed. The standard acceleration period T1 is from the start of the acceleration to the point P2 at which the focus error signal under acceleration becomes the acceleration stop level V. By setting the mask period $T_{mask}$ to about a half of the standard acceleration period T1, point P2 can be surely detected instead of point P1 when the apparatus is affected by external vibrations.

As explained above, the acceleration is performed not for a predetermined period, but until point P2 is detected, as in the first embodiment on track jumping. Then, even when the moving speed of the optical head 103 is affected by external disturbances, the position thereof after the movement can invariably be kept constant. Further, the speed fluctuation around the zero cross point (point Z) is canceled by increasing the amplitude of the deceleration pulse for fast a moving speed (acceleration period<standard acceleration period T1) and by decreasing the amplitude of the deceleration pulse for a slow moving speed (acceleration period>standard acceleration period T1), so that the position and the moving speed of the optical head 103 are invariably kept constant after the deceleration is completed. Then, stable focus jumping can be realized by the above-mentioned control against external disturbances on the position and the speed of the optical head 103.

Though the amplitude of deceleration pulse is changed according to the measured acceleration time in the above-mentioned embodiment, a similar advantage can be realized by changing the deceleration period under the same amplitude of the deceleration pulse. When $T_{measure}$ is longer than T1, the acceleration period is decreased less than standard deceleration period, while when $T_{measure}$ is shorter than T1, the acceleration period is increased more than the standard period.

Figure 12:
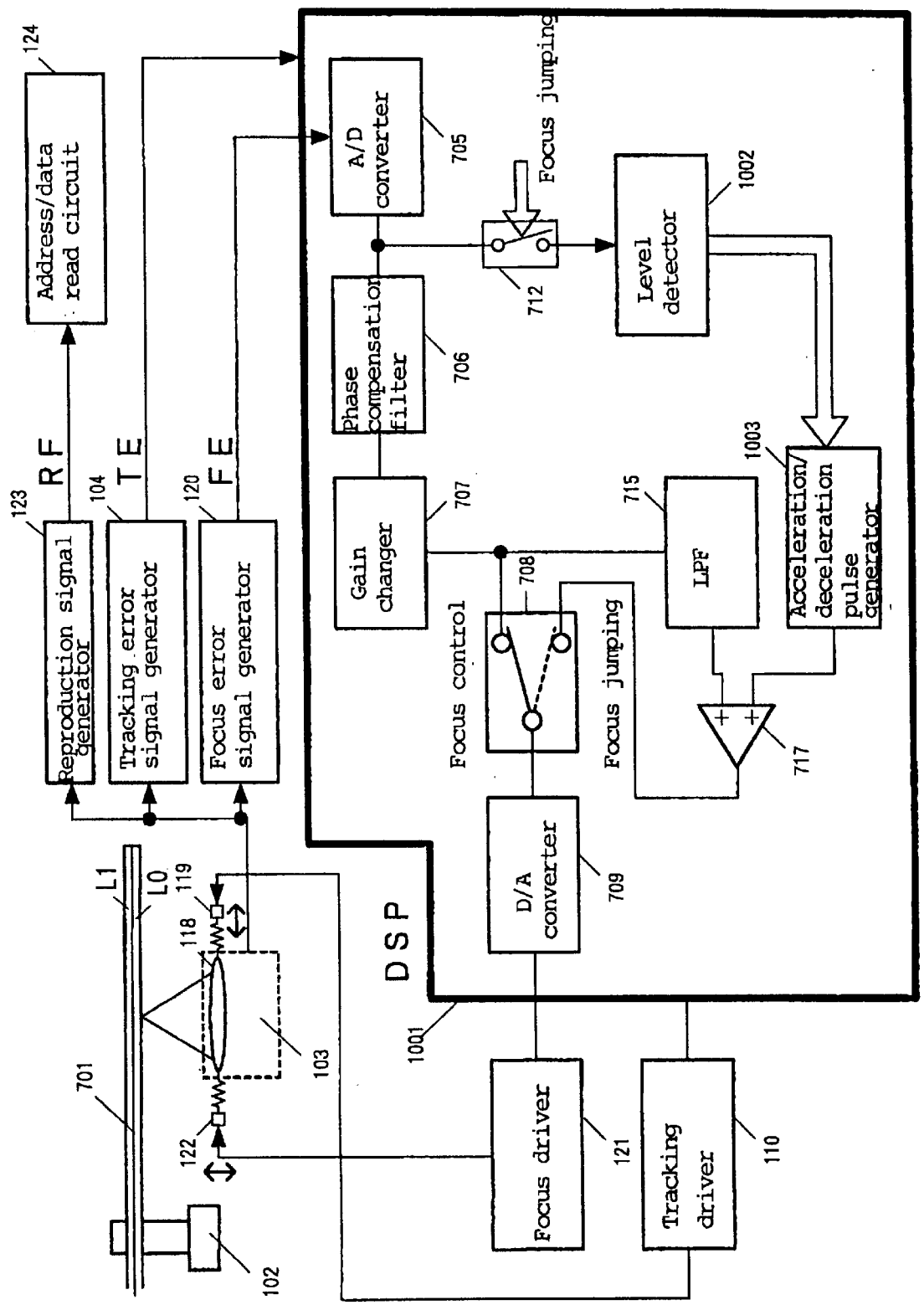
FIG. 12 is a block diagram of an optical recording and reproducing apparatus according to a fourth embodiment of the invention.

Next, an optical recording and reproducing apparatus of a fourth embodiment of the invention is explained. FIG. 12 is a block diagram of the optical recording and reproducing apparatus. The timer 713 and the decider 714 in the apparatus of the third embodiment shown in FIG. 9 are omitted, while a level detector 1002 is added in order to detect the level of focus error signal when the generation of deceleration pulse is stopped. Further, an acceleration/deceleration pulse generator 1003 generates an acceleration or deceleration pulse as explained below. The components included in the apparatus of the third embodiment have the like reference numbers in FIG. 12, and the explanation thereon is omitted here.

Figure 13A:
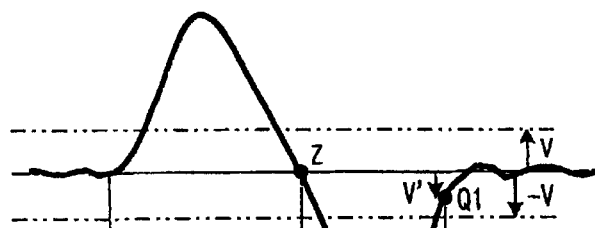
FIGS. 13A–13F are diagrams of focus error signal and focus drive waveform in the embodiment.
Figure 13B:
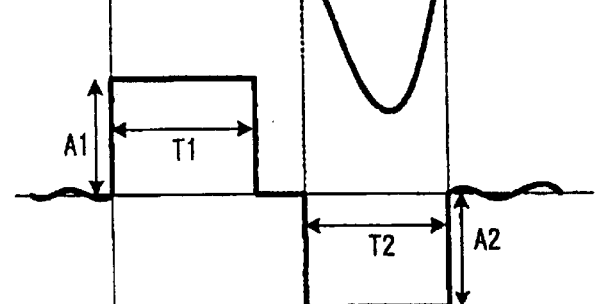
Figure 13C:
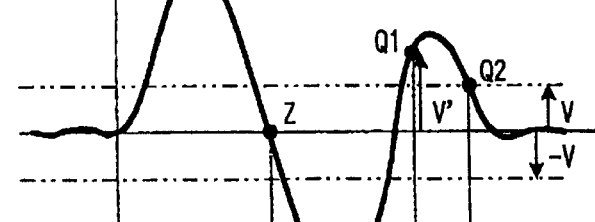
Figure 13D:
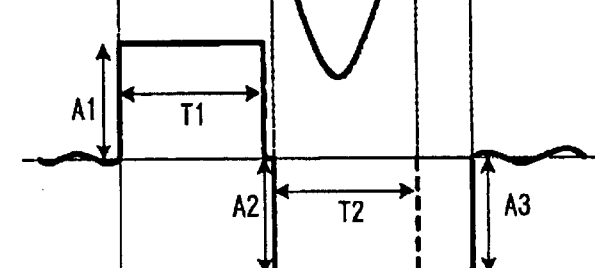
Figure 13E:
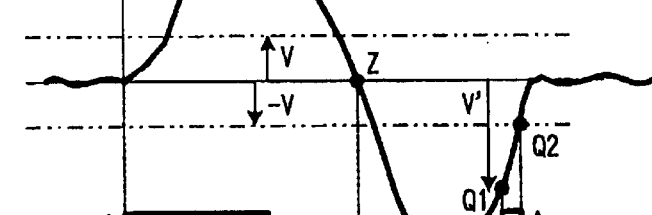
Figure 13F:
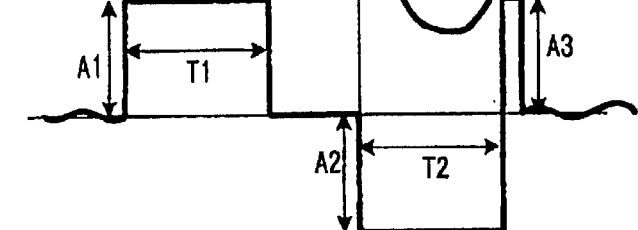

Next, focus jumping in this embodiment is explained with reference to the waveforms shown in FIGS. 13A–13F and to a flowchart of a digital signal processor 1001 of FIG. 14 beside the block diagram shown in FIG. 12. FIGS. 13A–13F show waveforms on focus jumping from a first information plane L0 to a second one L1 in an optical disk having a plurality of information planes. FIGS. 13A and 13B show focus error signal and focus drive waveform in normal situations, FIGS. 13C and 13D show focus error signal and focus drive waveform when the moving speed becomes fast due to external disturbances, while FIGS. 13E and 13F show counterparts when the moving speed becomes slow due to external disturbances. Focus jumping in the opposite direction from information plane L1 to L0 is similar, except that the polarities of the focus error signal and the focus drive waveform, and the waveforms and the explanation thereon are omitted.

For focus jumping, the digital signal processor 1001 has a switch 712, the level detector 1002 and the acceleration/deceleration pulse generator 1003. The switch 712 is set to "off" position for focus control. When focus jumping is started, the switch 712 is set to "on" position, and the switch 712 is closed. The focus error signal digitalized by the AD converter 705 in the digital signal processor 1001 is sent to the level detector 1002. Then, the acceleration/deceleration pulse generator 1003 generates an acceleration or deceleration pulse, and the focus actuator 122 moves the optical head 103 perpendicularly to the optical disk 701. In order to move the light beam from information plane L0 to L1 in the optical disk 701, the acceleration signal is applied to the focus actuator 122 for the optical head 103 to arrive to an intermediate position between the two information planes (an intermediate layer between two layers L0 and L1 or near a boundary between the two layers). Next, in order to decelerate the accelerated light beam, a deceleration signal is applied. Further, when the moving speed is largely affected by external disturbances, the focus actuator 122 is driven forcibly until the focus error signal level becomes smaller than a predetermined level.

Figure 14:
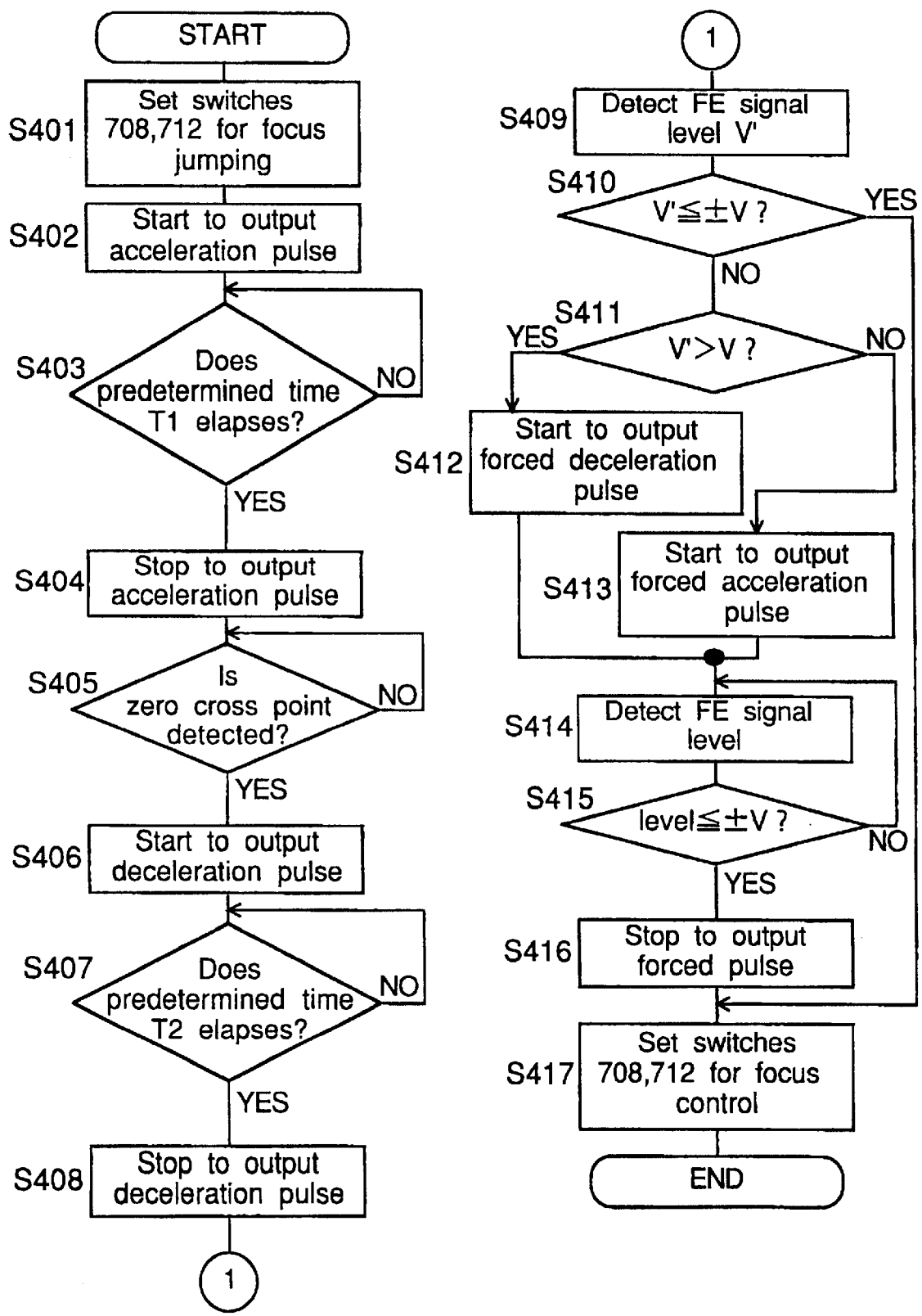
FIG. 14 is a flowchart of focus jumping in the embodiment.

FIG. 14 shows the flowchart of focus jumping of the digital signal processor 1001 in this embodiment. In FIG. 14, the switch 708 is set to "on" position for focus jumping as shown in FIG. 12 with a dashed line, and the switch 712 is closed (S401). Next, an acceleration pulse (of a predetermined amplitude A1) generated by the acceleration/deceleration pulse generator 1003 begins to be outputted (S402). Then, the optical head 103 begins to be moved in a direction perpendicular to the optical disk 701 from information plane L0 to L1. Then, a sinusoidal-like focus error signal appears. After a predetermined period T1 elapses (S403), the generation of acceleration pulse is stopped (S404). Next, it is waited that zero cross point (point Z in FIGS. 13A–13F) of the focus error signal is detected (S405). The zero cross point is detected as a cross point between the focus error signal outputted by the gain changer 707 and the output signal of the low pass filter 715. Next, the generation of deceleration pulse (of predetermined amplitude A2) is started (S406), and after a predetermined period T2 elapses (S407), the generation of deceleration pulse is stopped (S408). The amplitudes A1, A2 and the periods T1 and T2 are determined according to the sensitivity of the focus actuator 122 so that stable focus jumping can be performed in normal situations where no external disturbances such as vibrations are applied to the apparatus.

Next, the level detector 1002 detects the focus error signal level V' (level Q1 in FIGS. 13A, 13C and 13E) when the generation of the deceleration pulse is stopped (S409), and the detected level V' is compared with standard level V (S410). The standard level V is set so that stable focusing can be realized according to frequency characteristics of the focus control system. If the detected level V' is within a predetermined range (±V) (YES at S410), the flow proceeds to step S417, and the switch 708 is set to "off" position and the switch 712 is opened for focus control. Thus, the focus jumping between adjacent information planes is stopped, and the focus control is started again.

When the moving speed of the optical head 103 becomes fast due to external disturbances (V'>V) (YES at S411), as shown in FIG. 13C, deceleration is insufficient when the generation of the deceleration pulse is stopped, and the optical head 103 passes an object position for focus control. In this case, another deceleration pulse (or forced deceleration pulse) of predetermined amplitude A3 is started to be outputted to drive the focus actuator 122 forcibly for deceleration (S412). Then, the focus error signal is detected (S414), and it is waited that the level of the focus error signal is within the absolute value of V (S415) or at point Q2 in FIG. 13C.

On the other hand, when the moving speed of the optical head 103 becomes slow due to external disturbances (V'<−V) (NO at S411), as shown in FIG. 13E, deceleration is excessively performed when the generation of the deceleration pulse is stopped, and the optical head 103 does not reach the object position for focus control. In this case, another acceleration pulse (or forced acceleration pulse) of predetermined amplitude A3 is started to be outputted so as to drive the focus actuator 122 forcibly for acceleration (S413). Then, the focus error signal is detected (S414), and it is waited that the detected level of the focus error signal is within the absolute value of V (S415) or at point Q2 in FIG. 13E. When the focus error signal is decreased below the absolute value of V, the generation of the forced acceleration or deceleration pulse is stopped (S416). Then, the switch 708 is set to "off" position for tracking control as shown in FIG. 12 with a solid line, and the switch 712 is opened (S417). Thus, the focus jumping is completed, and the focus control is started again.

As explained above, the level of focus error signal is detected when the deceleration is stopped, and when the level of the focus error signal is not within the predetermined range, the focus actuator 122 is driven forcibly until the level enters in the predetermined range. Then, focus jumping is performed stably against external disturbances.

In the above-mentioned embodiment, the forced acceleration or deceleration pulse is applied to the focus actuator 122. Alternatively, the amplitude of the forced acceleration or deceleration pulse is changed according to the level of the focus error signal detected at step S409 or S414, so that the moving speed of the optical head 103 is kept constant when the generation of the forced pulse is stopped, and it is possible to secure higher performance on focusing.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical recording and reproducing apparatus comprising:
   a focus device operable to illuminate and focus a light beam onto a recording medium on which tracks are formed;
   a moving device operable to move said focus device in a direction to cross tracks on the recording medium;
   a tracking error detector operable to generate a tracking error signal in correspondence to a positional relationship between the light beam and a track on the recording medium;
   a tracking controller operable to drive said moving device to make the light beam scan the track according to the tracking error signal outputted by said tracking error detector;
   a track jumping device comprising an acceleration device and a deceleration device, said track jumping device being operable to move the light beam from a first track to an adjacent second track on the recording medium, said acceleration device being operable to apply an acceleration signal to said moving device to accelerate the light beam until the light beam reaches a predetermined point between the first and second tracks, said deceleration device being operable to apply a deceleration signal to said moving device to decelerate the light beam accelerated by said acceleration device; and
   a timer operable to measure a period from a first time when the light beam is started to move by said track jumping device to a second time when the light beam arrives at the predetermined point between the first and second tracks,
   wherein said deceleration device in said track jumping device is further operable to change an amplitude or period of the deceleration signal based on the period measured by said timer,
   wherein the deceleration signal outputted by said deceleration device is a pulse signal of a predetermined period,
   wherein said deceleration device is further operable to change an amplitude of the pulse signal according to the period measured by said timer, and
   wherein the pulse signal outputted by said deceleration device has an amplitude equal to a standard amplitude times a ratio of a standard moving time to the period measured by said timer.

2. The optical recording and reproducing apparatus according to claim 1, wherein said timer is operable to measure the second time as a time when the tracking error signal outputted by said tracking error detector has a level of about zero after the application of the acceleration signal by said acceleration device is completed.

3. The optical recording and reproducing apparatus according to claim 2, wherein after a predetermined time elapses from the first time, said timer is operable to measure the second time as a time when the tracking error signal outputted by said tracking error detector has the level of about zero.

4. An optical recording and reproducing apparatus comprising:
   a focus device operable to illuminate and focus a light beam onto a recording medium on which tracks are formed;
   a moving device operable to move said focus device in a direction to cross tracks on the recording medium;

a tracking error detector operable to generate a tracking error signal in correspondence to a positional relationship between the light beam and a track on the recording medium;

a tracking controller operable to drive said moving device to make the light beam scan the track according to the tracking error signal outputted by said tracking error detector;

a track jumping device comprising an acceleration device and a deceleration device, said track jumping device being operable to move the light beam from a first track to an adjacent second track on the recording medium, said acceleration device being operable to apply an acceleration signal to said moving device to accelerate the light beam until the light beam reaches a predetermined point between the first and second tracks, said deceleration device being operable to apply a deceleration signal to said moving device to decelerate the light beam accelerated by said acceleration device; and a timer operable to measure a period from a first time when the light beam is started to move by said track jumping device to a second time when the light beam arrives at the predetermined point between the first and second tracks, wherein said deceleration device in said track jumping device is further operable to change amplitude or period of the deceleration signal based on the period measured by said timer, wherein the deceleration signal outputted by said deceleration device is a pulse signal of a predetermined amplitude, wherein said deceleration device is further operable to change a period of the pulse signal according to the period measured by said timer, and wherein said deceleration device is further operable to change the period of the pulse signal to a period equal to a standard period times a ratio of the period measured by said timer to a standard moving time.

5. The optical recording and reproducing apparatus according to claim 4, wherein said timer is operable to measure the second time as a time when the tracking error signal outputted by said tracking error detector has a level of about zero after the application of the acceleration signal by said acceleration device is completed.

6. The optical recording and reproducing apparatus according to claim 5, wherein after a predetermined time elapses from the first time, said timer is operable to measure the second time as a time when the tracking error signal outputted by said tracking error detector has the level of about zero.

7. An optical recording and reproducing apparatus comprising:

a focus device operable to illuminate and focus a light beam onto a recording medium on which tracks are formed;

a moving device operable to move said focus device in a direction to cross tracks on the recording medium;

a tracking error detector operable to generate a tracking error signal in correspondence to a positional relationship between the light beam and a track on the recording medium;

tracking controller operable to drive said moving device to make the light beam scan the track according to the tracking error signal outputted by said tracking error detector;

a track jumping device comprising an acceleration device and a deceleration device, said track jumping device being operable to move the light beam from a first track to an adjacent second track on the recording medium, said acceleration device being operable to apply an acceleration signal to said moving device to accelerate the light beam until the light beam reaches a predetermined point between the first and second tracks, said deceleration device being operable to apply a deceleration signal to said moving device to decelerate the light beam accelerated by said acceleration device; and a forcible driver operable to apply a drive signal to said moving device after said deceleration device completes outputting of the deceleration signal until the level of the tracking error signal is decreased below a predetermined value, wherein the drive signal applied by said forcible driver is a pulse signal, and wherein said forcible driver is further operable to change an amplitude of the pulse signal according to a level of the tracking error signal outputted by said tracking error detector detected when the outputting of the deceleration signal is completed.

8. An optical recording and reproducing apparatus comprising:

a focus device operable to illuminate and focus a light beam onto a recording medium having a plurality of layered information planes;

a moving device operable to move said focus device in a direction perpendicular to the information planes in the recording medium;

a focus state detector operable to generate a focus error signal in correspondence to a focus state of the light beam in the recording medium;

a focus controller operable to drive said moving device according to the focus error signal outputted by said focus state detector to keep a focal position of the light beam in the recording medium generally constant;

a focus jumping device comprising an acceleration device and a deceleration device, said focus jumping device being operable to move the light beam from a first information plane to an adjacent second information plane in the recording medium, said acceleration device being operable to apply an acceleration signal to said moving device to accelerate the light beam until the light beam reaches a predetermined point between the first and second information planes, said deceleration device being operable to apply a deceleration signal to said moving device to decelerate the light beam accelerated by said acceleration device; and a timer operable to measure a period from a first time when the light beam is started to move by said focus jumping device to a second time when the light beam arrives at the predetermined point between the first and second information planes, wherein said deceleration device in said focus jumping device is further operable to change amplitude or period of the deceleration signal based on the period measured by said timer, wherein the deceleration signal outputted by said deceleration device is a pulse signal of a predetermined period, wherein said deceleration device is further operable to change an amplitude of the pulse signal according to the period measured by said timer, and wherein the amplitude of the pulse signal outputted by said deceleration device is changed to a standard amplitude times a ratio of a standard moving time to the period measured by said timer.

9. The optical recording and reproducing apparatus according to claim 8, wherein said timer is operable to measure the second time as a time when the focus error signal outputted by said focus state detector has a level of about zero after the application of the acceleration signal by said acceleration device is completed.

10. The optical recording and reproducing apparatus according to claim 9, wherein after a predetermined time elapses from the first time, said timer is operable to measure the second time as a time when the focus error signal outputted by said focus state detector has the level of about zero.

11. An optical recording and reproducing apparatus comprising:

a focus device operable to illuminate and focus a light beam onto a recording medium having a plurality of layered information planes;

a moving device operable to move said focus device in a direction perpendicular to the information planes in the recording medium;

a focus state detector operable to generate a focus error signal in correspondence to a focus state of the light beam in the recording medium;

a focus controller operable to drive said moving device according to the focus error signal outputted by said focus state detector to keep a focal position of the light beam in the recording medium generally constant;

a focus jumping device comprising an acceleration device and a deceleration device, said focus jumping device being operable to move the light beam from a first information plane to an adjacent second information plane in the recording medium, said acceleration device being operable to apply an acceleration signal to said moving device to accelerate the light beam until the light beam reaches a predetermined point between the first and second information planes, said deceleration device being operable to apply a deceleration signal to said moving device to decelerate the light beam accelerated by said acceleration device; and a timer operable to measure a period from a first time when the light beam is started to move by said focus jumping device to a second time when the light beam arrives at the predetermined point between the first and second information planes, wherein said deceleration device in said focus jumping device is further operable to change amplitude or period of the deceleration signal based on the period measured by said timer, wherein the deceleration signal outputted by said deceleration device is a pulse signal of a predetermined amplitude, wherein said deceleration device is further operable to change a period of the pulse signal according to the period measured by said timer, and wherein the period of the pulse signal outputted by said deceleration device is changed to a standard period times a ratio of a standard moving time to the period measured by said timer.

12. The optical recording and reproducing apparatus according to claim 11, wherein said timer is operable to measure the second time as a time when the focus error signal outputted by said focus state detector has a level of about zero after the application of the acceleration signal by said acceleration device is completed.

13. The optical recording and reproducing apparatus according to claim 12, wherein after a predetermined time elapses from the first time, said timer is operable to measure the second time as a time when the focus error signal outputted by said focus state detector has the level of about zero.

14. An optical recording and reproducing apparatus comprising:

a focus device operable to illuminate and focus a light beam onto a recording medium having a plurality of layered information planes;

a moving device operable to move said focus device in a direction perpendicular to the information planes in the recording medium;

a focus state detector operable to generate a focus error signal in correspondence to a detected focus state of the light beam in the recording medium;

a focus controller operable to drive said moving device according to the focus error signal outputted by said focus state detector to keep a focal position of the light beam in the recording medium generally constant;

a focus jumping device comprising an acceleration device and a deceleration device, said focus jumping device being operable to move the light beam from a first information plane to an adjacent second information plane in the recording medium, said acceleration device being operable to apply an acceleration signal to said moving device to accelerate the light beam until the light beam reaches a predetermined point between the first and second information planes, said deceleration device being operable to apply a deceleration signal to said moving device to decelerate the light beam accelerated by said acceleration device; and a forcible driver operable to apply a drive signal to said moving device after said deceleration device completes outputting of the deceleration signal, until the level of the focus error signal is decreased below a predetermined value, wherein the drive signal applied by said forcible driver is a pulse signal, and wherein said forcible driver is further operable to change an amplitude of the pulse signal according to a level of the focus error signal outputted by said focus state detector when the outputting of the deceleration signal is completed.

* * * * *